United States Patent
Agarwal et al.

(10) Patent No.: US 11,748,087 B2
(45) Date of Patent: Sep. 5, 2023

(54) SOFTWARE UPDATE DISTRIBUTION WITHIN A MULTI-TENANT ARCHITECTURE

(71) Applicant: Okta, Inc., San Francisco, CA (US)

(72) Inventors: Manish Agarwal, Sammamish, WA (US); Apoorva Deshpande, Milpitas, CA (US); Chuanbo Zhang, Redmond, WA (US); Mohammad Rahimi, San Carlos, CA (US)

(*) Notice: Subject to any disclaimer, the term of this patent is extended or adjusted under 35 U.S.C. 154(b) by 0 days.

(21) Appl. No.: 17/360,686

(22) Filed: Jun. 28, 2021

(65) Prior Publication Data
US 2022/0413827 A1 Dec. 29, 2022

(51) Int. Cl.
G06F 8/65 (2018.01)
G06F 8/71 (2018.01)
G06F 11/34 (2006.01)
G06F 11/30 (2006.01)
G06F 11/07 (2006.01)

(52) U.S. Cl.
CPC .......... *G06F 8/65* (2013.01); *G06F 8/71* (2013.01); *G06F 11/0709* (2013.01); *G06F 11/3006* (2013.01); *G06F 11/3419* (2013.01)

(58) Field of Classification Search
CPC ......... G06F 8/65; G06F 8/71; G06F 11/0709; G06F 11/3006; G06F 11/3419
USPC ........................................................ 717/168
See application file for complete search history.

(56) References Cited

U.S. PATENT DOCUMENTS

| | | | |
|---|---|---|---|
| 8,271,889 B1* | 9/2012 | Beckert | G06F 8/65 705/40 |
| 2005/0262498 A1* | 11/2005 | Ferguson | B66C 13/18 717/172 |
| 2006/0112387 A1* | 5/2006 | Butt | G06F 8/65 717/177 |
| 2009/0089784 A1* | 4/2009 | Walters | G06F 9/485 718/102 |
| 2011/0145399 A1* | 6/2011 | Jeyapaul | G06F 11/3089 709/224 |
| 2012/0066672 A1* | 3/2012 | Smith | G06F 8/65 717/170 |
| 2014/0282480 A1* | 9/2014 | Matthew | G06F 8/65 717/172 |

(Continued)

OTHER PUBLICATIONS

Liu et al, "UaaS: Software Update as a Service for the IaaS Cloud", 2015, [Online], pp. 483-490, [Retrieved from internet on Apr. 11, 2023], <https://ieeexplore.ieee.org/stamp/stamp.jsp?arnumber=7207390> (Year: 2015).*

(Continued)

*Primary Examiner* — S. Sough
*Assistant Examiner* — Zengpu Wei
(74) *Attorney, Agent, or Firm* — Holland & Hart LLP (57) ABSTRACT

A multi-tenant system provides software-updating functionality that selectively updates tenant systems according to a number of different factors. In some embodiments, the factors include evaluation of "health metrics" that quantify how well tenant systems are functioning after an update of software components to the latest version, policies specified by either the tenants or the multi-tenant system (or both), and/or "kill switches" specified by the multi-tenant system that prevent updating, as some examples.

18 Claims, 4 Drawing Sheets

(56) References Cited

U.S. PATENT DOCUMENTS

2019/0146774 A1* 5/2019 Moore .................. G06F 8/65
717/172
2021/0081188 A1* 3/2021 Rajagopalan ............. G06F 8/65

OTHER PUBLICATIONS

Github, "Google Omaha," Retrieved from the Wayback Machine from date Jan. 18, 2020, one page, [Online] Retrieved from the Internet <URL: https://web.archive.org/web/20200118010027/https://github.com/google/omaha>.

Sparkle-Project, "Sparkle," Retrieved from the Wayback Machine from date Dec. 12, 2019, two pages, [Online] Retrieved from the Internet <URL: https://web.archive.org/web/20191212073234/https://sparkle-project.org/>.

The Update Framework, "The Update Framework," Retrieved from the Wayback Machine from date Dec. 19, 2019, three pages, [Online] Retrieved from the Internet <URL: https://web.archive.org/web/20191219032738/https://theupdateframework.io/>.

WinSparkle, "WinSparkle: Easy Updates on Windows," Retrieved from the Wayback Machine from date Jan. 18, 2019, two pages, [Online] Retrieved from the Internet <URL: https://web.archive.org/web/20190118034357/https://winsparkle.org/>.

* cited by examiner

SOFTWARE UPDATE DISTRIBUTION WITHIN A MULTI-TENANT ARCHITECTURE

FIELD OF ART

The present invention generally relates to the field of software systems, and more specifically, to a mechanism for providing software updates to collaborating systems in a manner that encourages updates while minimizing any system risks from the updates.

BACKGROUND

A multi-tenant system provides services to multiple different organizations ("tenants") with which the multi-tenant system has a relationship. For example, a multi-tenant system might provide identity and single sign-on (SSO) services, database services, sales lifecycle services, or the like, to its tenants. In many instances, the multi-tenant system and its tenant organizations are integrated, with the tenants specifying code and/or metadata that controls what the multi-tenant system executes on its behalf, and the tenants installing software components of the multi-tenant system within their own systems so that they can more easily access the functionality of the multi-tenant systems. As one example of such software components, a multi-tenant system handling user identity verification on behalf of its tenants might include a verification software component for the client devices of its tenants that allows the client devices to communicate with the multi-tenant system to transparently provide the functionality to the tenants.

In the case of such integration between the multi-tenant system and its tenants, the tenants may be slow to update the components of the multi-tenant system that the tenants have locally installed. Disadvantageously, this lessens the ability of the tenants to take advantage of the features of the most current version of the components, such as new functionality, greater performance, greater security, or the like. Further, this results in the potential co-existence of many different versions of the components (e.g., different versions used by different tenants), which puts a burden on those responsible for the multi-tenant system to continue to support many different versions of the components. Alternatively, if the tenants all updated the components immediately once the multi-tenant system had made the updated components available, that could lead to different problems, such as much more widespread failures in the case of any bugs, incompatibilities, or other flaws in the latest version of a particular component.

SUMMARY

A multi-tenant system provides software-updating functionality that selectively updates tenant systems according to a number of different factors. In some embodiments, the factors include evaluation of "health metrics" that quantify how well tenant systems are functioning after an update of software components to the latest version, policies specified by either the tenants or the multi-tenant system (or both), and/or "kill switches" specified by the multi-tenant system that prevent updating, as some examples.

In some embodiments in which tenant systems poll the multi-tenant systems to determine whether software updates are available, the multi-tenant system specifies a delay to the polling tenants to lessen the polling load on the multi-tenant system, thereby enhancing scalability.

In some embodiments, the system employs cryptographic verification in order to ensure that the updated software components are genuine and not from a malicious actor.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

One or more organizations (hereinafter "tenants") have formed a relationship with a multi-tenant system in order to obtain the services provided by the multi-tenant system. In order to allow the systems of the tenants to obtain the services of with the multi-tenant system, the multi-tenant system makes software components available to the tenant, and the tenants install the components within their tenant systems (e.g., on clients or servers of the tenant system). For example, if the multi-tenant system provided identification services to the tenants, it might provide components for client devices of the tenant that monitor access of users of the client devices to resources of the tenant systems and—if the user has not been authenticated—communicate with the multi-tenant system to authenticate the user before access to the resources is provided.

It is advantageous for the organization owning the multi-tenant system (hereinafter also referred to simply as "the multi-tenant system" for simplicity) that the tenants regularly update the software components provided by the multi-tenant system so that (a) the tenants are able to take advantage of new features offered by the multi-tenant system, (b) the multi-tenant system isn't indefinitely burdened by the responsibility of maintaining older versions of the components, and (c) flaws in software are more promptly patched. At the same time, the multi-tenant system wishes to minimize any problems that may arise due to any unanticipated bugs in the components or incompatibilities between the components and the tenant systems.

Figure 1:
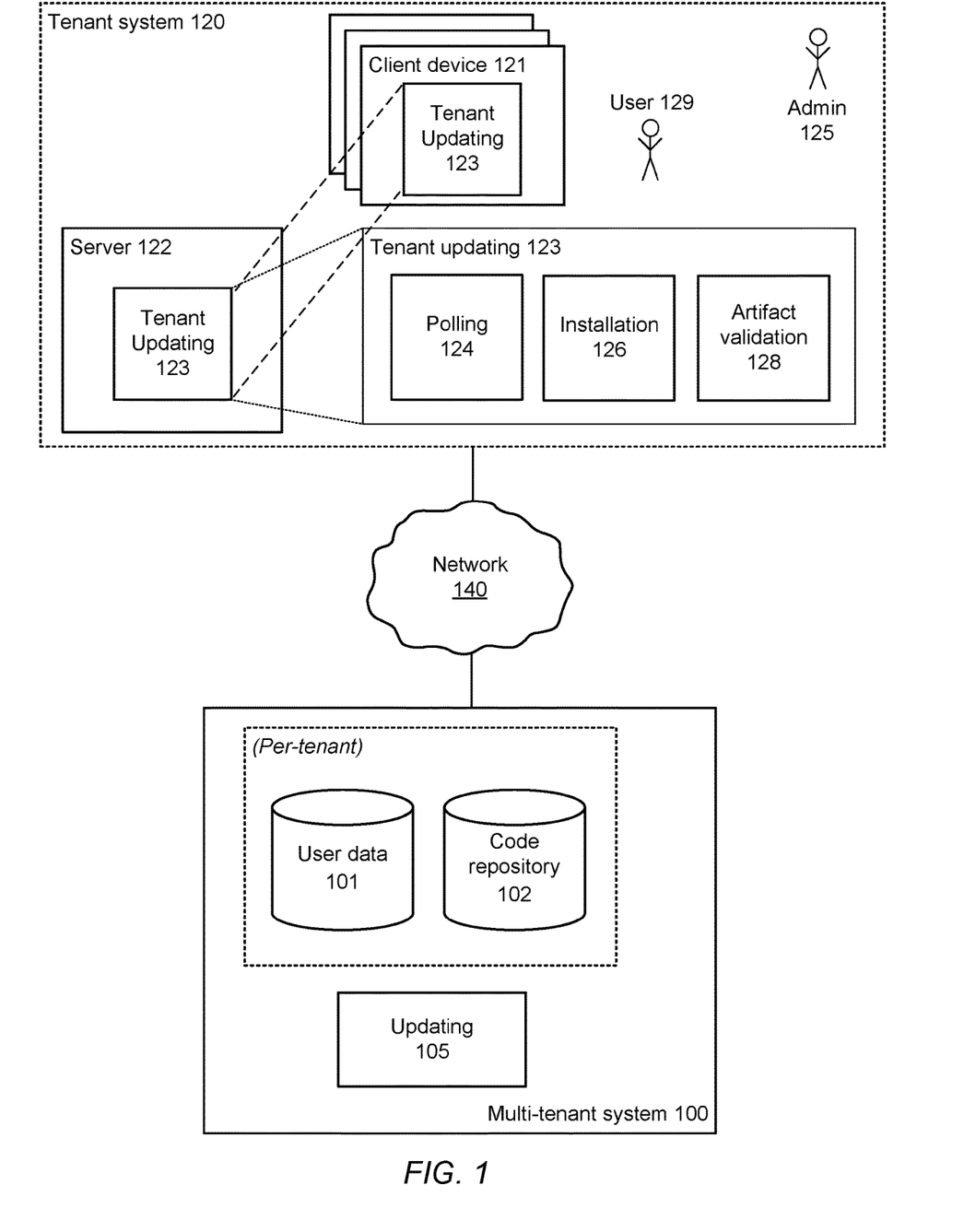
FIG. 1 illustrates one embodiment of a computing environment in which a multi-tenant system provides services to a number of different tenants, according to some embodiments.

FIG. 1 illustrates one embodiment of a computing environment in which a multi-tenant system provides services to a number of different tenants, according to some embodiments. The various tenants have systems 120 that may include a tenant server system 122 that supports integration of the tenant with the multi-tenant system 100 and that performs functionality related to the updating of the software components that are used in the integration.

The organization tenant is an entity, such as a business, a school, a governmental agency, or the like, that has a number of affiliated users 129, such as employees, volunteers, customers, or contractors. The organization also has or integrates with one or more client devices 121 that the users 129 use to perform tasks on behalf of the tenant. In other embodiments, the users are not affiliated with an organization, but instead act independently using client devices 121 belonging to them.

The multi-tenant system 100 may group its various tenants into groups ("cells"), each cell including some number of the tenants. The grouping into cells may be based upon geographic location, e.g., with 5 cells in North America, for example. Tenants with geographic locations spanning multiple cells may be split across cells, with portions of the tenant systems 100 within the geographical boundaries of a first cell being assigned to the first cell, and portions within the geographical boundaries of a second cells being assigned to the second cell.

The multi-tenant system 100 provides the users 129 of the tenants with access to services or other types of resources. The multi-tenant system 100 may store, for each tenant system 120, user data 101 that include a set of identities of known users with accounts on the multi-tenant system 100, and a code repository 102 containing the latest version of code used by those tenant systems 120 for integrating with the multi-tenant system 120. The user data 101 may include a form of identity on the multi-tenant system 100 such as a username, as well as other credential data associated with a user, such as a user password or information derived therefrom. The user data 101 may also include many other types of data about users, such as their role(s) or group(s) within the tenant organization to which they belong (e.g., "Engineering", "Legal", "Manager 2", "Director", or the like), and/or the services or other resources to which they have access (e.g., third-party applications such as SALESFORCE, MICROSOFT OFFICE 365, SLACK, or the like), as some examples. The user data 101 may also include identities and credentials of the various users on the various accounts to which they have access, thereby linking a user's identity on the multi-tenant system 100 to the user's identities on those different accounts and (by extension) permitting access to those accounts. In some embodiments, a tenant system 120 includes a multi-tenant system 100 as a subsystem, rather than accessing it as an independent entity, as in other embodiments.

As an example of a service provided by the multi-tenant system 100 to tenant systems 120, in some embodiments, the multi-tenant system 100 includes single sign-on (SSO) functionality that allows the multi-tenant system to transparently log a user in to the different accounts or other resources to which the user has access through the user's tenant organization. For example, for a given user who has logged in to the multi-tenant system 100, the multi-tenant system can look up the user's accounts or other resources within the user data 101, as well as the user's credentials for those accounts. Using the credentials, as well as metadata or other information about the accounts, the multi-tenant system 100 can automatically log the user into the applications or other resources described in the user data 101, such as by establishing application sessions with the various applications and providing corresponding session data (e.g., session tokens) to the user's client device 121. Thus, with a single login to the multi-tenant system 100, the SSO functionality of the multi-tenant system provides a user with automatic access to all the user's accounts or other resources. The multi-tenant system 100 may provide other services in other embodiments, such as database access, messaging, video, or any other type of service or resource in which tenant systems 120 and/or their client devices 121 install software components in order to integrate with the multi-tenant system 100 to obtain access to those services or resources.

The multi-tenant system 100 has a code repository 102 containing at least the latest version of code making up an integration component software used by tenant systems 120 for integrating with the multi-tenant system 100. The code is composed of one or more code artifacts, which are file units used to install the integration component. The code artifacts may include, but are not limited to, PKG files, MSI (Microsoft Installer) files, or RPM (Red Hat Package Manager) files. Code of the code repository 102 can be installed both on the server 122 (e.g., as performed by administrators of the tenant) and on the user client devices 121 of a given tenant. The code may support multiple operating systems, such as APPLE MACINTOSH, MICROSOFT WINDOWS, UNIX, or LINUX.

Figure 2:
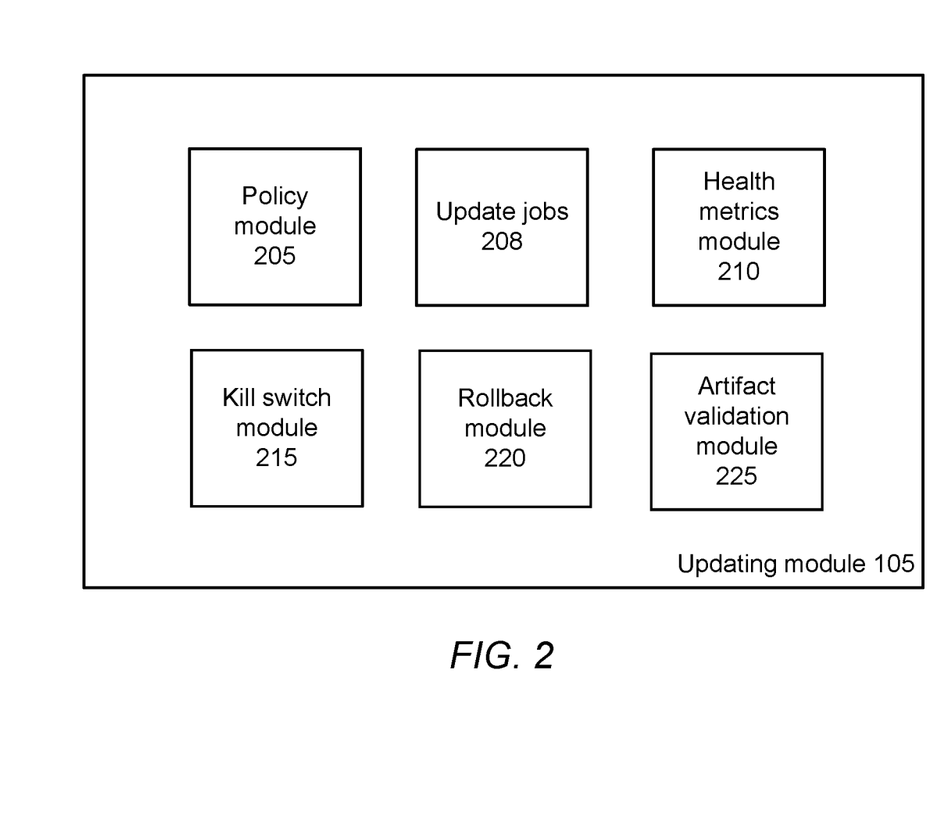
FIG. 2 illustrates software components of the updating module of FIG. 1, according to some embodiments.

The multi-tenant system 100 additionally has an updating module 105 that handles the provision to the tenant systems 120 of updates to the integration components. FIG. 2 illustrates software components of the updating module 105, according to some embodiments.

The updating module 105 controls whether an updated integration component will be provided to a given client device 121 or to a server 122 of the tenant system 120. The updating module 105 has a policy module 205 that determines whether a particular client device 121, tenant system 120, or entire cell, is eligible to receive an updated integration component, regardless of any particular knowledge of how well the updated integration component is functioning. The policy used by the policy module 205 may be specified by the multi-tenant system 100 itself for any tenant, or by a particular tenant for any of its client devices 121. For example, the multi-tenant system 100 may specify only a certain subset of its tenants (e.g., a list of particular tenants, or all the tenants of a particular cell) should be eligible to receive updates at the present time. Similarly, a tenant (e.g., a tenant administrator) may specify that only particular ones of its client devices 121 (e.g., those on a list of specific users, or those belonging to specified user groups within the tenant, such as users of the Accounting department) should be eligible to receive updates at the present time. Through this use of policies that limit updates to a subset of all client devices 121, the multi-tenant system 100 and/or a particular tenant can specify that rollout of updated integration components proceed in well-defined stages, so that if any bugs or other errors exist within the updated integration components the result of such errors will be minimized.

The updating module 105 also has a health metrics module 210 that assesses whether, in fact, a particular updated integration component contains errors. The health metrics module 210 tracks a set of metrics over time, determining based on the metrics whether the updated integration component is functioning properly. The metrics may be derived at least partly from user-agent header data of data provided by the client devices 121 and may include, but are not limited to, the number of successful logins of the client devices 121 to the multi-tenant system 100 (successful logins indicating that the updated integrated component is still performing its proper function in interacting with the multi-tenant system), client software version, operating system version, indicators of successful operations, indicators of failed operations, number of calls of client devices 121 to the multi-tenant system 100 relative to those during prior periods, the amount of time taken to perform updates, and the time taken to perform operations, among others. In some embodiments, the metrics are aggregated (e.g., at a fixed interval since the last time that the updated integration component was provided), with the aggregated statistics used to determine whether (e.g., a yes/no Boolean, or a probability) the updated integration component is functioning properly. The health metrics module 210 may also collect metadata associated with the metrics, such as the operating system, software version, user ID, and/or date and time of the collection of the particular metric. This metadata enables the health metrics module 210 to make more granular determinations for client devices corresponding to particular values of the metadata, such as that the updated integration component is not functioning properly for client devices of a particular geographic region, or for client devices having a particular operating system version, but is functioning properly for other client devices.

In embodiments in which the multi-tenant system 100 affirmatively pushes updates to the tenant systems 120, the client updating module 105 includes an update jobs module 208, which handles the pushing of updates. For example, the update jobs module 208 could inform the client devices 121 or server 122 of the tenant system 120 when new versions of the code are available in the code repository 102, and/or proactively provide the new versions of the code for installation on the client devices and/or server.

In some embodiments, the results of the health metrics module 210 determine how further distribution of the updated integration component will proceed. For example, in some embodiments if the health metrics module 210 determines that the updated integration module is not functioning properly for some group of client devices 121 (e.g., all devices, or only a subset having particular associated metadata), the updating module 105 automatically halts further distribution of the updated integration module to additional client devices, at least to the group of devices in question. In some embodiments, if the health metrics module 210 determines that the updated integration module is in fact functioning properly for some group of client devices, the updating module 105 automatically expands the distribution to an additional set of client devices, e.g., to additional devices within the group, or to a wider or different group (e.g., to clients of additional tenants, to clients having a different operating system, or the like).

The updating module 105 may also have a kill switch module 215, which determines whether the multi-tenant system 100 and/or a particular tenant has already specified that additional rollout of the updated integration component should cease. For example, if an administrator of the multi-tenant system 100 determines (e.g., as a result of the factor health module 210 metric tracking) that a given updated integration component is not functioning properly (either for all client devices, or for a particular subset thereof), the administrator may specify that the updated integration component should no longer be provided (or no longer provided to the particular subset or subset related thereto). Similarly, an administrator of a particular tenant might request that the multi-tenant system 100 not provide the updated integration component to additional ones of its client devices 121.

The updating module 105 may also have a rollback module 220 that "undoes" a prior installation of the updated integration component, e.g., in the event that the updated integration component is determined to be functioning improperly for some or all of the client devices. In some embodiments, the rollback module 220 logs identities of client devices 121 or servers 122 to which the updated integration component has been provided (or a subset thereof deemed to be the subset in which the updated integrated component is functioning improperly) and causes or request those client devices to replace the updated integration component with a prior version. In other embodiments, the rollback module 220 communicates with the tenant systems 120 and requests the tenant systems to cause its own client devices 121 and/or server 122 to replace the updated integration component with a prior version.

The updating module 105 also has an artifact validation module 225 that—together with an artifact validation module 128 of the tenant systems 120—ensures that tenants install only genuine integration components from the multi-tenant system 100. This can defeat, for example, malicious third parties injecting spurious versions of the components into the communicating channel between the multi-tenant sever 100 and the tenant systems 120, assuming that the malicious third parties manage to gain access to the network in the first place. The artifact validation module 225 digitally signs the code artifacts making up the integration components, such as with a root key (which can be stored and applied completely offline) and/or a signing key (which can be rotated on a periodic basis). The code artifacts may be individually signed, or a single package containing the code artifacts may be signed, for example.

In embodiments in which tenant systems 120 poll the multi-tenant system 100 to determine whether updated integration components are available, the updating module 105 may also control the rate at which such polling may be performed. For example, in some embodiments, when a tenant system 120 (e.g., via a polling module 124 of a server 122) polls the multi-tenant system 100 for updated integration components, the update module 105 responds to the tenant system with an indication of a next time when the tenant system 120 may again poll for an update. This prevents the performance of the multi-tenant system from being degraded by constant inquiries from multiple tenant systems 120. In one embodiment, each artifact and software update includes the release frequency (e.g., once a month, once every quarter, etc.), release date, and release version. The multi-tenant system 100 will compare the current client version with the latest stored version and (depending on how far it is from next release date) set a "retry-after" header accordingly to request the client to reduce its polling rate. In other situations, the multi-tenant system 100 can instead request clients to check more frequently during some time period after an update in the anticipation of a possible hotfix release or rollback, and can request the clients to back down with a long polling interval after the expiration of that time period. In different embodiments, the exact time update frequency can be predetermined, negotiated with the client, or determined by current or historic system load.

Returning to FIG. 1, the tenant system 120 may include a server 122 that supports integration of the tenant with the multi-tenant system 100 and that performs functionality related to the updating of the software components that are used in the integration. In some embodiments, integration components of the multi-tenant system 100 are also installed on the server 122, in addition to the client devices 121. For example, integration components installed on the server 122 could include Active Directory Agents for Microsoft Active Directory™ that sync information about users, groups and devices of a tenant system 120 with information about these entities stored on the multi-tenant system 100.

In some embodiments, the client devices 121 and/or the server 122 include a tenant updating module 123 that handles the obtaining and installation of new versions of integration components. The tenant updating module 123 includes a polling module 124 that contacts the multi-tenant system periodically to determine whether a newer version of a particular integration component is available. In other embodiments, the updating module 105 of the multi-tenant system 100 instead notifies the various tenant systems 120 when such an update is available.

In some embodiments, the tenant updating module 123 includes an installation module 126 that installs the updated integration components, e.g., by installing the various code artifacts making up the components. The installation module 126 may also communicate with the rollback module 220, e.g., by carrying out the requests of the rollback module to uninstall a particular updated integration component and reinstall a prior version.

In some embodiments, the tenant updating module 123 includes an artifact validation module 128 that—together with the artifact validation module 225 of the multi-tenant system 100—ensures that tenants install only genuine integration components from the multi-tenant system. For example, the artifact validation module 128 can ensure that all artifacts of the updated integration component pass hash validation, and that any installation file for the artifacts passes signature verification before installation module 126 installs the updated integration component.

Physically, the tenant system 120 is made up of a number of computing systems, including the various client devices 121; one or more internal networks that connects the computing systems, including routers or other networking devices that define the boundary between the organization and external networks; the server 122 (if any); and the like.

Similarly, the multi-tenant system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 3:
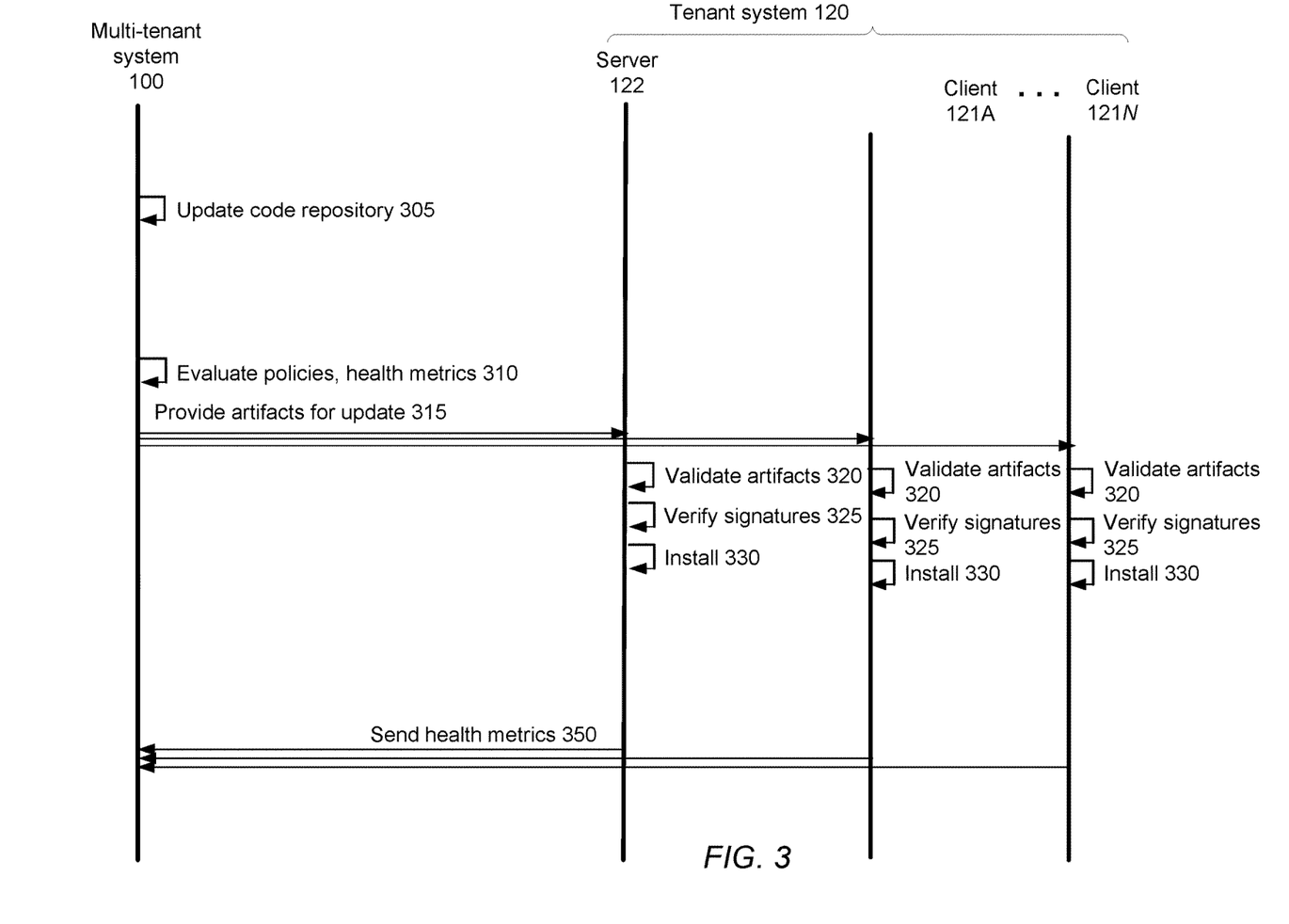
FIG. 3 illustrates the sequence of actions performed by the entities of FIG. 1 when updating an integration component, according to some embodiments.

FIG. 3 illustrates the sequence of actions performed by the entities of FIG. 1 when updating an integration component, according to some embodiments. In step 305, the code repository 102 of the multi-tenant system 100 is updated to reflect a new version of an integration component used by tenants. For example, engineers of the entity responsible for the multi-tenant system may author a new version of the integration component and place it within the code repository 102.

At some later point, the multi-tenant system 100 determines that the updated integration component should potentially be distributed to some or all of the client devices 121 of the various tenant systems 120. For example, in push-based embodiments in which the multi-tenant system 100 determines when to distribute updates to its tenants, this could occur in response to the updating 305 of the code repository 102, and/or at periodic intervals thereafter, as some examples. In pull-based embodiments in which the tenant systems poll the multi-tenant system 100 for updates to the integration components (not illustrated in FIG. 3), this could be in response to a poll received from a server 122 or client 121 of a tenant system 120 of a particular tenant. The multi-tenant system evaluates 310 its policies and previously-collected health metrics, as discussed above with respect to the policy module 205 and health metric module 210. If the policies allow the updated integration component to be distributed to a particular tenant/client device 121 of a tenant, and the health metrics do not indicate that the updated integration component is functioning improperly, then the multi-tenant system 100 provides 315 the artifacts making up the updated integration component to the tenant system (e.g., to the server 122, as illustrated in FIG. 3, or directly to individual client devices 121).

Each client 121 or server 122 to which the updated integration component is distributed then proceeds to verify the update and—if the verification succeeds—to install it. The artifact validation module 128 determines that the individual artifacts and/or the installer for installing the artifacts are undamaged and originate from the multi-tenant system 100, as described above with respect to FIG. 1. If verification succeeds, the installation module 126 proceeds to install the updated integration component. The multi-tenant system 100 later obtains 350 health metrics as described above with respect to the health metrics module 210, aggregating those metrics and using them to determine whether the updated integration component is functioning properly and thus should be distributed to additional tenants and the client devices thereof.

Figure 4:
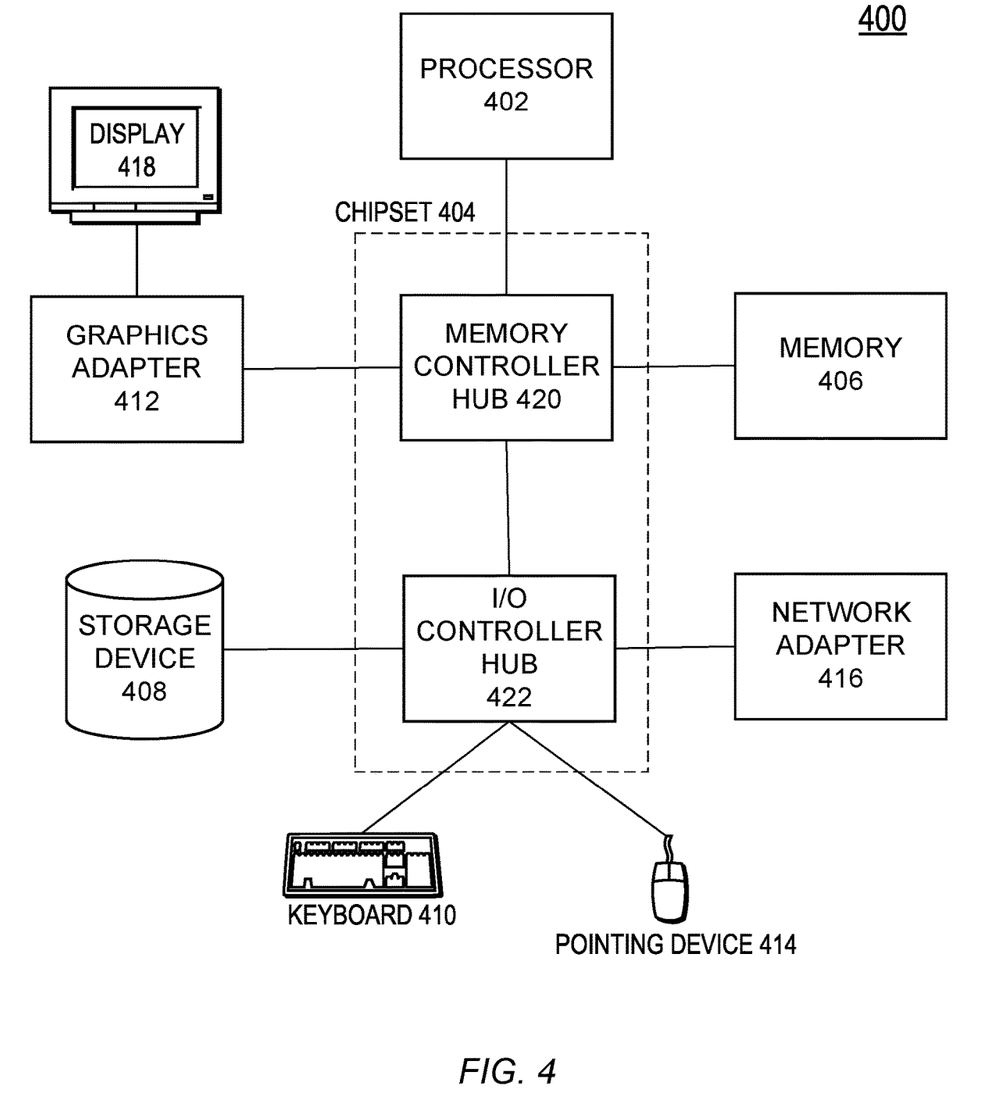
FIG. 4 is a high-level block diagram illustrating physical components of a computer 400 used as part or all of (for example) the multi-tenant system 100, the client devices 121, and/or the server 122 and, according to one embodiment.

FIG. 4 is a high-level block diagram illustrating physical components of a computer 400 used as part or all of (for example) the multi-tenant system 100, the client devices 121, and/or the server 122 and, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard 410 or pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for distributing software updates to tenant organizations of a multi-tenant system, the computer-implemented method comprising:
   distributing an integration component to the tenant organizations of the multi-tenant system, the integration component permitting client devices of the tenant organizations to use a service of the multi-tenant system;
   receiving a first updated integration component that is an updated version of the integration component;
   for a first tenant organization of the multi-tenant system, and for different client devices of the first tenant organization, determining whether to provide the first updated integration component to the different client devices, wherein the determining comprises:
      receiving, from a client device of the different client devices of the first tenant organization, a poll message to determine whether an updated integration component for the first tenant organization is available;
      comparing a current time to a time of last update or to a time of next release as estimated in a prior release;
      based on the comparison, adjusting an amount of time for the client device to delay before sending another poll message, the amount of time different from a prior amount of time for the client device to delay;
      determining a next time for the client device to poll for the updated integration component; and
      sending the client device a response specifying the next time; and
   selectively providing the first updated integration component to the different client devices based on the determination of whether to provide the first updated integration component.

2. The computer-implemented method of claim 1, further comprising:
receiving a kill switch instruction from an administrator of the first tenant organization;
refraining from providing the first updated integration component to a client device of the first tenant organization responsive to the receipt of the kill switch instruction; and
providing the first updated integration component to a client device of a second organization, wherein a kill switch instruction from the second tenant organization has not been received.

3. The computer-implemented method of claim 1, further comprising:
determining that the first updated integration component functions improperly; and
responsive to determining that the updated integration component functions improperly, causing the different client devices to uninstall the first updated integration component and to reinstall a prior version of the first updated integration component.

4. The computer-implemented method of claim 1, further comprising:
obtaining health metrics from a first subset of the different client devices, of the first tenant organization, that have installed the first updated integration component;
based on the health metrics, determining whether the first updated integration component functions improperly for the first subset of the different client devices of the first tenant organization; and
responsive to determining that the first updated integration component functions improperly for the first subset of the different client devices of the first tenant organization, refraining from providing the first updated integration component to a second subset of the different client devices, of the first tenant organization, that lack the first updated integration component.

5. The computer-implemented method of claim 4, wherein the first subset is defined by metadata including at least one of: operating system, operating system version, user group membership, or geographic location.

6. The computer-implemented method of claim 4, wherein the health metrics comprise numbers of successful logins to the multi-tenant system via the first updated integration component.

7. A non-transitory, computer-readable medium storing instructions that, when executed by a computer processor, perform actions comprising:
distributing an integration component to tenant organizations of a multi-tenant system, the integration component permitting client devices of the tenant organizations to use a service of the multi-tenant system;
receiving a first updated integration component that is an updated version of the integration component;
for a first tenant organization of the multi-tenant system, and for different client devices of the first tenant organization, determining whether to provide the first updated integration component to the different client devices, wherein the determining comprises:
receiving, from a client device of the different client devices of the first tenant organization, a poll message to determine whether an updated integration component for the first tenant organization is available;
comparing a current time to a time of last update or to a time of next release as estimated in a prior release;
based on the comparison, adjusting an amount of time for the client device to delay before sending another poll message, the amount of time different from a prior amount of time for the client device to delay;
determining a next time for the client device to poll for the updated integration component; and
sending the client device a response specifying the next time; and
selectively providing the first updated integration component to the different client devices based on the determination of whether to provide the first updated integration component.

8. The non-transitory, computer-readable medium of claim 7, the actions further comprising receiving a kill switch instruction from an administrator,
wherein the determination of whether to provide the first updated integration component to the different client devices comprises determining, based at least in part on whether the kill switch instruction has been received, whether to provide the first updated integration component to a first client device of the different client devices.

9. The non-transitory, computer-readable medium of claim 7, the actions further comprising:
determining that the first updated integration component functions improperly; and
responsive to determining that the first updated integration component functions improperly, causing the different client devices to uninstall the first updated integration component and to reinstall a prior version of the first updated integration component.

10. The non-transitory, computer-readable medium of claim 7, the actions further comprising:
obtaining health metrics from a first subset of the different client devices of the first tenant organization, that have installed the first updated integration component;
based on the health metrics, determining whether the first updated integration component functions improperly for the first subset of the different client devices of the first tenant organization; and
responsive to determining that the first updated integration component functions improperly for the first subset of the different client devices of the first tenant organization, refraining from providing the first updated integration component to a second subset of the different client devices, of the first tenant organization, that lack the first updated integration component.

11. The non-transitory, computer-readable medium of claim 10, wherein the first subset is defined by metadata including at least one of: operating system, operating system version, user group membership, or geographic location.

12. The non-transitory, computer-readable medium of claim 10, wherein the health metrics comprise numbers of successful logins to the multi-tenant system via the first updated integration component.

13. A computer system comprising:
a computer processor; and
a computer-readable storage medium storing instructions that, when executed by the computer processor, perform actions comprising:
distributing an integration component to tenant organizations of a multi-tenant system, the integration component permitting client devices of the tenant organizations to use a service of the multi-tenant system;

receiving a first updated integration component that is an updated version of the integration component;

for a first tenant organization of the multi-tenant system, and for different client devices of the first tenant organization, determining whether to provide the first updated integration component to the different client devices, wherein the determining comprises:

receiving, from a client device of the different client devices of the first tenant organization, a poll message to determine whether an updated integration component for the first tenant organization is available;

comparing a current time to a time of last update or to a time of next release as estimated in a prior release;

based on the comparison, adjusting an amount of time for the client device to delay before sending another poll message, the amount of time different from a prior amount of time for the client device to delay;

determining a next time for the client device to poll for the updated integration component; and     sending the client device a response specifying the next time; and selectively providing the first updated integration component to the different client devices based on the determination of whether to provide the first updated integration component.

14. The computer system of claim 13, the actions further comprising receiving a kill switch instruction from an administrator, wherein the determination of whether to provide the first updated integration component to the different client devices comprises determining, based at least in part on whether the kill switch instruction has been received, whether to provide the first updated integration component to a first client device of the different client devices.

15. The computer system of claim 13, the actions further comprising:

determining that the first updated integration component functions improperly; and responsive to determining that the first updated integration component functions improperly, causing the different client devices to uninstall the first updated integration component and to reinstall a prior version of the first updated integration component.

16. The computer system of claim 13, the actions further comprising:

obtaining health metrics from a first subset of the different client devices, of the first tenant organization, that have installed the first updated integration component;

based on the health metrics, determining whether the first updated integration component functions improperly for the first subset of the different client devices of the first tenant organization; and responsive to determining that the first updated integration component functions improperly for the first subset of the different client devices of the first tenant organization, refraining from providing the first updated integration component to a second subset of the different client devices, of the first tenant organization, that lack the first updated integration component.

17. The computer system of claim 16, wherein the first subset is defined by metadata including at least one of: operating system, operating system version, user group membership, or geographic location.

18. The computer system of claim 16, wherein the health metrics comprise numbers of successful logins to the multi-tenant system via the first updated integration component.

* * * * *